(12) United States Patent
Braudes et al.

(10) Patent No.: US 10,261,997 B2
(45) Date of Patent: Apr. 16, 2019

(54) METHOD, APPARATUS, AND SYSTEM FOR PROVIDING AND USING SUBSCRIPTIONS AND FILTERING BASED ON TREE STRUCTURES

(71) Applicant: Avaya Inc., Santa Clara, CA (US)

(72) Inventors: Robert Braudes, Erie, CO (US); Gordon R. Brunson, Broomfield, CO (US); Kenneth O. Michie, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 533 days.

(21) Appl. No.: 13/801,721

(22) Filed: Mar. 13, 2013

(65) Prior Publication Data

US 2014/0280018 A1    Sep. 18, 2014

(51) Int. Cl.
*G06F 17/30* (2006.01)

(52) U.S. Cl.
CPC ........ *G06F 17/30* (2013.01); *G06F 17/30477* (2013.01)

(58) Field of Classification Search
CPC ......... G06F 17/30477; G06F 17/30657; G06F 17/30699; G06F 17/30964; G06F 17/30554; G06F 17/30498; G06F 17/30607

USPC .......................................................... 707/713
See application file for complete search history.

(56) References Cited

U.S. PATENT DOCUMENTS

| | | | |
|---|---|---|---|
| 8,589,373 B2* | 11/2013 | Mayer | G06F 17/30991 439/152 |
| 2004/0199539 A1* | 10/2004 | Richardson et al. | 707/102 |
| 2005/0289097 A1* | 12/2005 | Trossen | H04L 41/06 |
| 2006/0136382 A1* | 6/2006 | Dettinger et al. | 707/3 |
| 2007/0106767 A1* | 5/2007 | Yamamoto | G06F 17/30604 709/223 |
| 2009/0067439 A1* | 3/2009 | Yamamoto et al. | 370/400 |
| 2010/0217837 A1* | 8/2010 | Ansari et al. | 709/218 |
| 2011/0238649 A1 | 9/2011 | Jenkins et al. | |
| 2013/0104046 A1* | 4/2013 | Casco-Arias Sanchez et al. | 715/736 |
| 2013/0246454 A1* | 9/2013 | Menten | 707/769 |

* cited by examiner

*Primary Examiner* — James Trujillo
*Assistant Examiner* — Fariborz Khoshnoodi
(74) *Attorney, Agent, or Firm* — Sheridan Ross P.C.

(57) ABSTRACT

Methods and systems are provided such that users, servers, and applications may utilize an extensible data filtering model where data is organized into a tree with filtering available at any node level. Accordingly, the node filtering and propagation method and system allows for the efficient management and automatic replication of common information for multiple applications at all data levels.

20 Claims, 9 Drawing Sheets

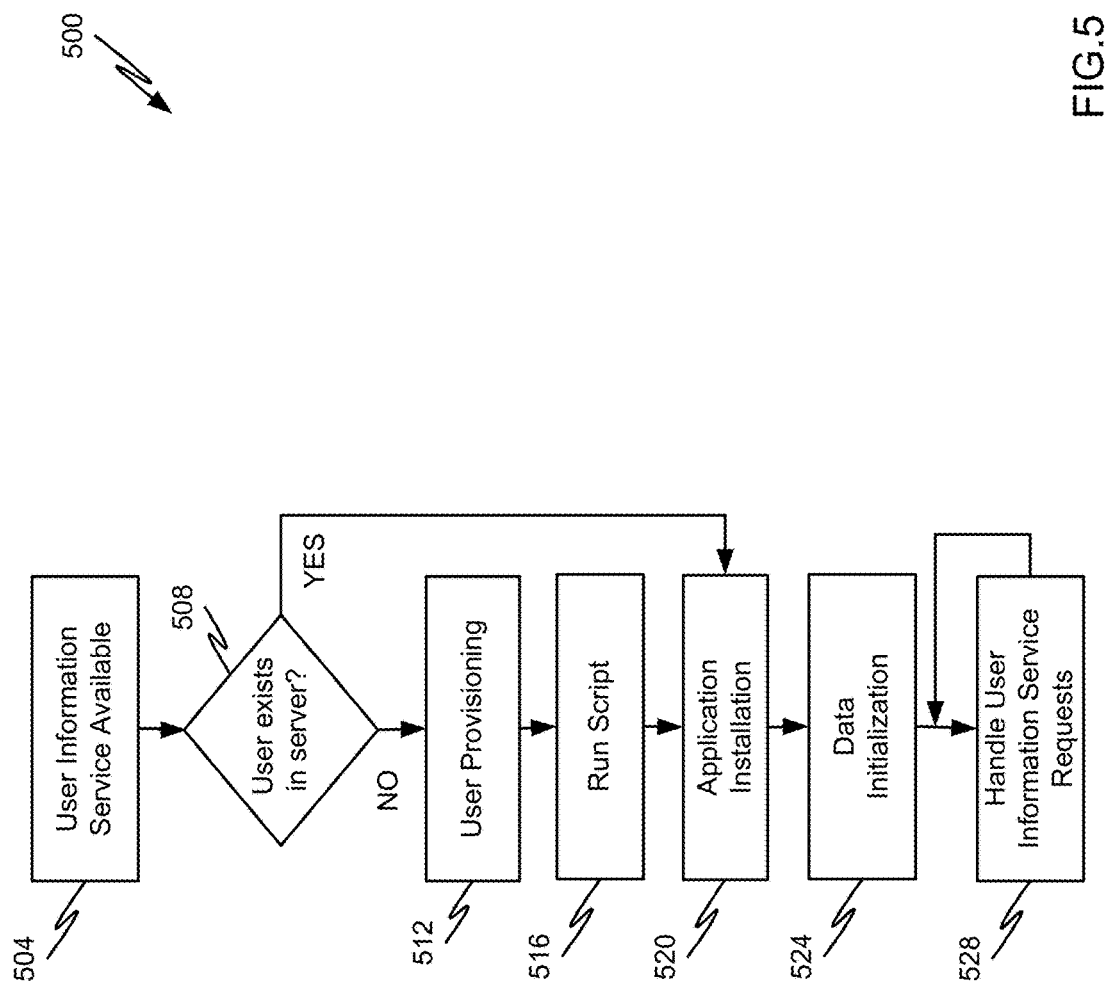

METHOD, APPARATUS, AND SYSTEM FOR PROVIDING AND USING SUBSCRIPTIONS AND FILTERING BASED ON TREE STRUCTURES

FIELD

The present disclosure is generally directed to enterprise data management.

BACKGROUND

A filtering mechanism is typically used to narrow the scope of data that is presented to an application or to a user, depending on database structure and the needs of a company. Sometimes it makes sense for the company to organize its database into a tree structure, but trees can be difficult to filter because a tree structure has many layers. Additionally, some filtering schemes have access only to certain levels of tree structures, thereby making it difficult to further filter data that is organized as a tree structure. Furthermore, limited level access may not allow delivery of multi-level data required by some applications.

There are methods that attempt to overcome data filtering limitations, including mySQL databases with native recursive queries and traversals, custom nodes, database triggers, and ArrayCollection. The use of database triggers is common, where the database itself provides a mechanism for an application to specify that it wants some code to be executed when one or more fields are updated in the database. The database triggers work for some enterprises, but the method can be very slow and inefficient. It is also common to use an ArrayCollection as a data provider for tree data. There are functions that loop through each node and its children recursively. A node or its children must match a certain criterion or set of criteria, but this method has speed and efficiency issues as well. As mentioned previously, filters may be too limited to get to the levels of a tree needed by an application. Custom nodes can present special challenges as data smoothness can be problematic. An ArrayCollection is limited in that it only works on the first level of objects unless there is built-in recursion. Recursion is a grossly inefficient option as it requires going into every child and setting the filterFunction on each ArrayCollection of each child.

SUMMARY

It is with respect to the above issues and other problems that the embodiments presented herein were contemplated. Methods and systems are disclosed for providing an extensible data filtering model where data is organized into a tree. The extensible data filtering model allows filtering at any level, with nodes added to a tree after a query is defined, and with automatic propagation into a data structure. More particularly, a communication server in conjunction with a database is provided with the capability to use a filtering and propagation mechanism to write to the database, add nodes, and provide up-to-date information to end users, applications, and/or servers based on queries and subscriptions. The filtering and propagation mechanism, in some embodiments, is able to extract data using simple to complex filters at all levels of a data tree. A filter is sent with a query or persistent subscription. When information is added or changed within the data structure by a user, application, or server, the filtering and propagation mechanism is able to determine and communicate the change (e.g., the delta) with other users, applications, and/or servers in their respective logical folders as needed without administrator intervention. The operations of servers and clients extend the available information, providing new tables which may be linked as available data based on the filter. Additionally, the filtering and propagation mechanism is able to retrieve information from an unforeseen structure added to the data tree once the query or persistent subscription is defined.

Logical folders can be used to organize files or to share information from memory without storing copies in multiple application folders. Logical folders are not representations of the actual location of files on a hard drive, but the information contained within may be shared with multiple applications. A new application may also be able to provide data via a filter module that executes the filtering and propagation mechanism and receive updates from users, administrators, and other applications automatically.

In accordance with at least some embodiments of the present disclosure, a system that provides a communication server and database environment for data management is provided. The system includes a communication server that executes a filter module. The communication server can receive and/or return data that is available to users, applications, and/or servers through communication devices that are interconnected to the communication server, either directly or through one or more networks. In addition, embodiments of the present disclosure highlight that filtered data is presented and stored in such a way that the data is user-based rather than application-based or device-based. Accordingly, a query or subscription may be sent requesting user-specific information, and that application or device will receive up-to-date user data each time that any data that falls within the filter's scope is updated or changed by any other application or device. The information is accessible via multiple protocols simultaneously, including but not limited to HTTP and SIP, thus achieving near real-time coordination among many important communications applications and devices. The information sharing based on multi-level node filtering and automatic propagation facilitates the evolution of efficient application coordination.

Methods in accordance with embodiments of the present disclosure include providing a filter module through a central service, such as through a communication server accessible via a network. User information is initially created, added, or migrated into the communication server which is served by the filtering and propagating capabilities provided by a dynamic database schema and a filtering module. Embodiments of the present disclosure manage user information to and from a variety of devices, providing readily available, up-to-date, and efficiently replicated user information.

Although embodiments of the present disclosure will be primarily described in connection with communication services or communication systems, it should be appreciated that "services" as used herein can include any type of feature or feature set that is made available to a user or group of users either within a single enterprise or within multiple enterprises.

The term "User Information Service" as used herein refers to a scalable database service that contains data provisioned by or on behalf of a user. The User Information Service receives SIP, HTTP, or other protocol requests to access Contacts, Contact Lists, Presence Access Control Lists, Communication Logs, and other user-specific data. This information is shared across multiple applications, including HTTP, SIP, or other protocol-enabled applications on clients, web applications, and communication applications. The SIP subscriptions persist, allowing the operation of other servers and clients to extend the availability of user-specific data.

The term "filter" as used herein should be understood to include any mechanism or combination of mechanisms that enable information extraction from one or more data structures, potentially allowing selection of specific records based on one or more defined criteria. For example, a filter can be applied to a database to return only records containing a specific text string in a specific data field. Types of filters include, but are not limited to, single criterion-multiple fields filters, single field-multiple criteria filters, single field-single criterion filters, custom filters, and the like.

The term "extensibility" as used herein should be understood to refer to a principle where an implementation takes into consideration future growth. Extensibility is a measure of ability and level of effort needed to extend a system. The system is designed to include mechanisms for expanding/enhancing the system without requiring major changes to the system's infrastructure.

The term "tree" as used herein should be understood to refer to a data structure that simulates a hierarchical tree structure with a set of linked nodes. The term "node" as used herein should be understood to refer to a structure which may contain a value, a condition, or represent a separate data structure. Each node in a tree has zero or more child nodes, which are below it in the tree. A node that has a child is called the child's parent or superior node. The topmost node in a tree is called a root node. Being the topmost node, the root node will not have parents. Nodes at the bottom-most level of the tree are called "leaf" nodes. Open-source databases typically do node-to-node information replication.

The term "subscription" as used herein should be understood to refer to an agreement to receive or be given access to services, updates, and data on an ongoing basis as changes occur.

The term "schema" as used herein should be understood to refer to a framework or set of rules for the organization and validation of stored data. Schema may have rules that are predefined and/or user defined. The schema, in some embodiments, sets boundaries and parameters, possibly defining objects in a database structure.

The term "dialog" as used herein should be understood to refer to a communication session. Some examples might include but are not limited to the communication session between a user's device and an application, module, or server; and the communication session between two users' devices, applications, modules or servers, in any combination.

The phrases "data access object" and "data abstraction object" (DAO) as used herein refer to an object that provides to a database an abstract interface and specific data operations, independent of database details.

The term "Hypertext Transfer Protocol" (HTTP) as used herein refers to an application protocol for distributed, collaborative, hypermedia information systems. HTTP is the foundation of data communication for the World Wide Web, coordinated by the Internet Engineering Task Force (IETF) and the World Wide Web Consortium (W3C). Hypertext is a multi-linear set of objects, building a network by using logical links (the so-called hyperlinks) between the nodes (e.g. text or words). HTTP is the protocol to exchange or transfer hypertext.

The term "SIP" as used herein refers to Session Initiation Protocol. SIP is as described in RFC 3261, dated June 2002, by Rosenberg et al., available from the Internet Engineering Task Force (IETF); this document and all other documents (e.g., RFC 3264, RFC 3265, RFC 4566, 4660, 4661, etc.) from the IETF describing SIP are herein incorporated by reference in their entirety for all that they teach. The embodiments may use SIP or other protocols to accomplish the processes described herein.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. The database may be hosted within the communication server or on a separate server. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

Additional features and advantages of embodiments of the present invention will become more readily apparent from the following description, particularly when taken together with the accompanying drawings.

BRIEF DESCRIPTION OF THE DRAWINGS

The present disclosure is described in conjunction with the appended figures:

FIG. 5 is a flow chart depicting a method of creating a schema and writing information to a data filtering system in accordance with embodiments of the present disclosure.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
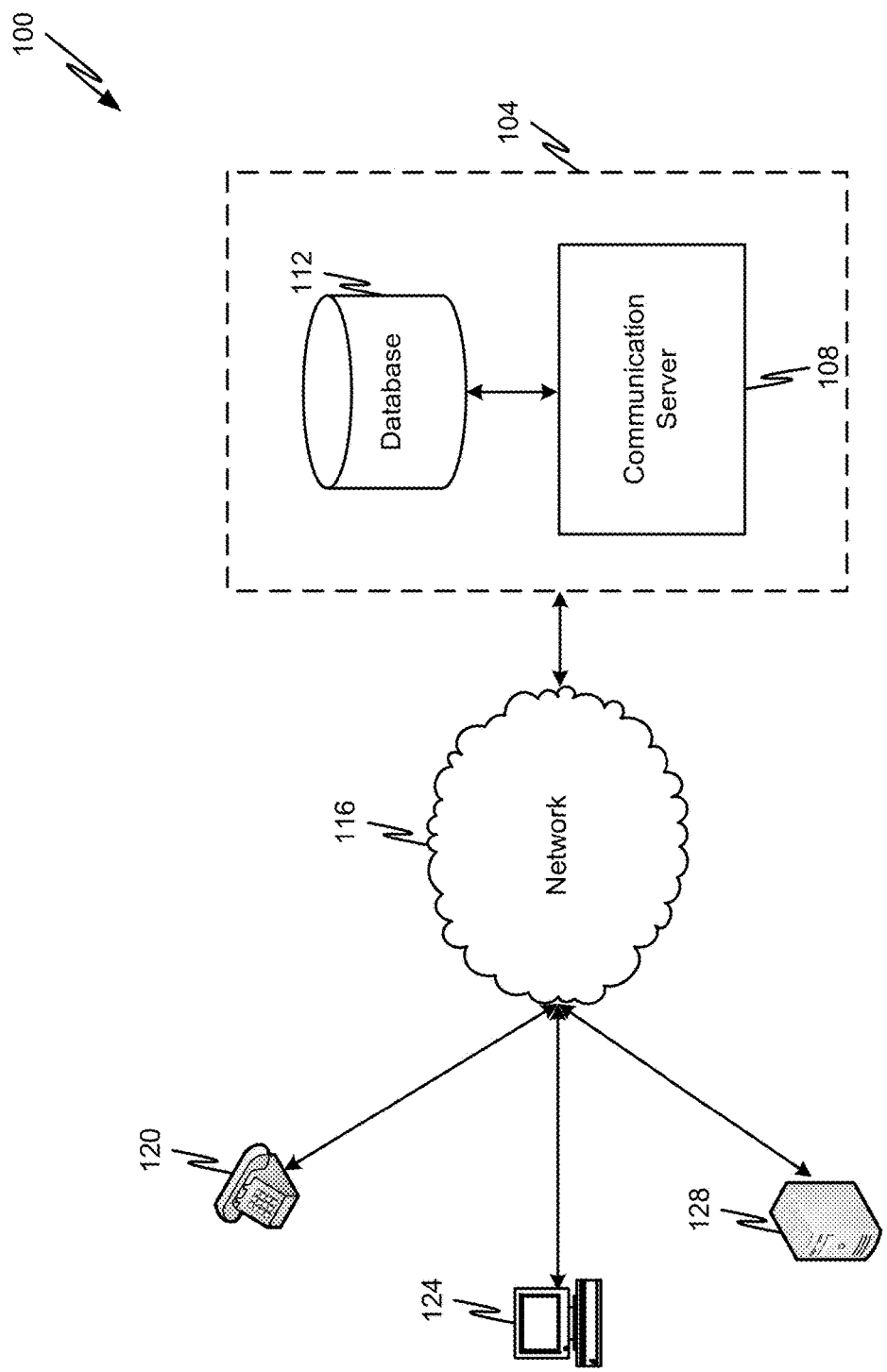
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprise one or more enterprise communication networks 116 that facilitate communications among the various devices and elements of the overall system including a User Information Service 104. The User Information Service 104 may comprise one of at least a communication server 108 and a database 112. The User Information Service may be accessed by one or more communication devices, including but not limited to user devices 120, applications 124, servers 128, and/or applications residing on any of the communication devices.

The enterprise communication network 116 may be packet-switched and/or circuit-switched. An illustrative enterprise communication network 116 includes, without limitation, a Wide Area Network (WAN), such as the Internet, a Local Area Network (LAN), a Personal Area Network (PAN), a Public Switched Telephone Network (PSTN), a Plain Old Telephone Service (POTS) network, a cellular communications network, an IP Multimedia Subsystem (IMS) network, a Voice over IP (VoIP) network, a SIP network, or combinations thereof. In one configuration, the enterprise communication network 116 is a public network supporting the TCP/IP suite of protocols. Communications supported by the enterprise communication network 116 include real-time, near-real-time, and non-real-time communications. For instance, the enterprise communication network 116 may support voice, video, text, web conferencing, or any combination of media. Moreover, the enterprise communication network 116 may comprise a number of different communication media such as coaxial cable, copper cable/wire, fiber-optic cable, antennas for transmitting/receiving wireless messages, and combinations thereof. In addition, it can be appreciated that the enterprise communication network 116 need not be limited to any one network type, and instead may be comprised of a number of different networks and/or network types.

The enterprise communication network 116 may provide a location where one or more communication devices 120, 124, 128 and the User Information Service 104 can access and use network services. Examples of services that may be offered by the User Information Service 104 via the enterprise communication network 116 include store-and-forward communication services, media services, data storage and retrieval services, processing services, application services, combinations thereof, and any other automated or computer-implemented services, applications, or telephony features. In some embodiments, the enterprise communication network 116 may provide access to the User Information Service 104, whose services may be provided by a web module, server, or group of web servers and may be administered or controlled by an administrator.

The User Information Service 104 may provide one or more communication devices 120, 124, 128 with subscription, notification, query, filtering, create, read, update, delete, publish, and put capabilities. The capabilities may provide specific updates to a schema. Queries may be written against the database 112 with optional filters constraining the data returned in response to the query. Applications on communication devices 120, 124, 128 may be operable to subscribe to changes in the database 112 using an optional filter. When data that meets filter requirements is updated, the applications may be notified of changes. The User Information Service 104 may be defined by metadata, including nodes, leaves, and attributes. The metadata is updated using the create, read, update, and delete capabilities.

It should be appreciated that the User Information Service 104 may be distributed. Although embodiments of the present disclosure will refer to one User Information Service 104, it should be appreciated that the embodiments claimed herein are not so limited. For instance, multiple User Information Services may be joined by different servers and networks. Users may be associated with multiple instances of the User Information Service 104 and may be connected through the enterprise communication network 116 to other user services, communication networks, enterprise networks, and companies.

In accordance with at least some embodiments of the present disclosure, the communication devices 120, 124, 128 may comprise any type of known communication equipment or collection of communication equipment. Examples of a suitable communication device 120, 124, 128 include, but are not limited to, a personal computer, laptop, tablet, Personal Digital Assistant (PDA), cellular phone, smartphone, telephone, server, or combinations thereof. In general, each communication device 120, 124, 128 may be adapted to support video, audio, text, applications, queries, subscriptions, and/or data communications with other communication devices 120, 124, 128 as well as the processing resources of the communication server 108. The type of medium used by the communication devices 120, 124, 128 to communicate with other communication devices 120, 124, 128 or processing resources of the communication server 108 may depend upon the communication applications and features available on the communication devices 120, 124, 128 and on the communication server 108.

Figure 2:
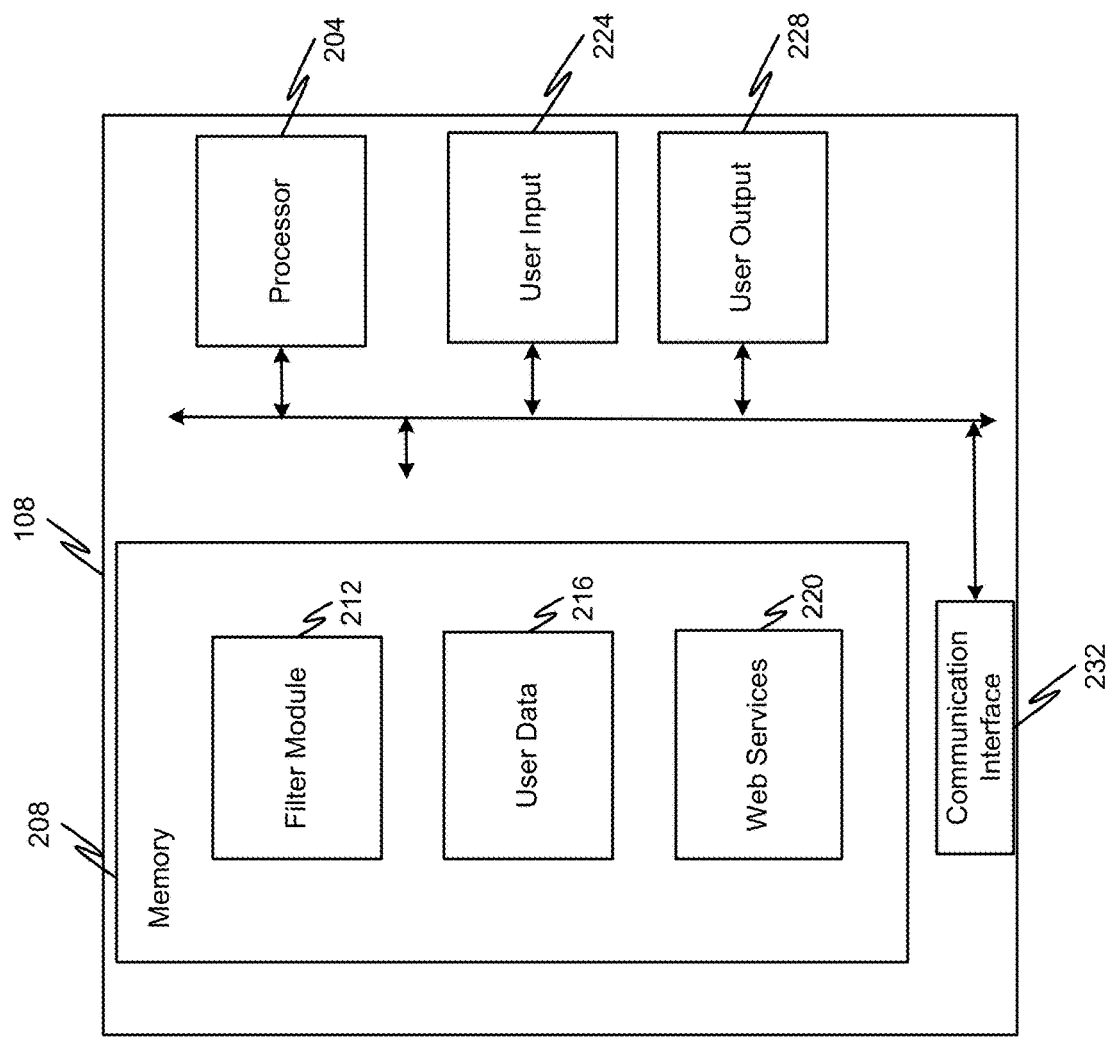
FIG. 2 is a block diagram depicting components of a communication server that are utilized in accordance with embodiments of the present disclosure.

FIG. 2 depicts an illustrative embodiment of a communication server 108 in accordance with at least some embodiments of the present disclosure. In some embodiments, the communication server 108 can include a processor 204 capable of executing program instructions. The processor 204 can include any general purpose programmable processor or controller for executing application programming. Alternatively, the processor 204 may comprise an application specific integrated circuit (ASIC). The processor 204 generally functions to run programming code implementing various functions performed by the associated server or device. The processor 204 of the communication server 108 can operate to present shared and personal information to one or more communication devices 120, 124, 128 through execution of a web services module 220 using information from a user data module 216 and an internal or external database 112.

The communication server 108 additionally includes memory 208. The memory 208 can be used in connection with the execution of programming by the processor 204, and for the temporary or long term storage of data and/or program instructions. For example, the processor 204 in conjunction with the memory 208 of the communication server 108 can implement extensible filtering and replication software for data that is used by communication devices 120, 124, 128 through the communication server's 108 modules 212, 216, 220. The communication server 108, in some embodiments, contains modules 212, 216, 220 within the memory 208 to support the implementation. The modules may run in concert or the modules may execute functions as discrete modules. The communication server 108 may include one or more of, but is not limited to, a filter module 212, a user data module 216, and a web services module 220.

For example, the communication server 108 memory 208 can include software implementing the filter module 212, the user data module 216, and the web services module 220 to provide access to and the capabilities of the extensible filtering and replication mechanism that may be executed by the filter module 212. The memory 208 of the communication server 108 or communication device 120, 124, 128 can include solid state memory that is resident, removable and/or remote in nature, such as DRAM and SDRAM. Moreover, the memory 208 can include a plurality of discrete components of different types and/or a plurality of logical partitions. In accordance with still other embodiments, the memory 208 comprises a non-transitory computer readable storage medium. Such a medium may take many forms, including but not limited to, non-volatile media, volatile media, and transmission media. The filter module 212 within the communication server 108 in conjunction with the processor 204 may communicate with an internal database 112. The database 112 may be external or internal to the communication server 108. The filter module 212 is operable to take requests from the communication device 120, 124, 128 that generated the request. A request in the form of a query or subscription may be sent from the communication server 108 to the database 112. Subscriptions and queries may retrieve data from any node level within the database 112 with support from the modules 212, 216, 220 which may also spawn automatic replication of the data. A PUBLISH or PUT operation may be used to make data changes.

The request in the form of a query or a subscription can be generated by a communication device 120, 124, 128. For example, a user device may send a query to communication server 108 to retrieve Bob's telephone number. An application might send a subscription request that asks for updates for anything beneath a certain node, like Gordon's contacts. A server might send a query for a snapshot update of all users in Westminster, for example. These requests may be received by the communication server 108 processor 204.

The filter module 212 within the processor 204 may determine whether the request is a one-time query or a subscription. The filter module 212 may also determine if the query or subscription is in protocol format HTTP, SIP, or another protocol that can perform read and write functions. The query or subscription may have different formats depending on which protocol format is presented. For example, a RESTful HTTP GET may be the mechanism if the query is in the HTTP protocol format, and a subscription may be the SIP mechanism for the query in the SIP protocol format.

Once the request type has been determined and the protocol identified as SIP, the communication server 108 filter module 212 may apply a filter based on the request and send it out via a NOTIFY message. Subsequent data changes may also be sent out via NOTIFY messages. An eventing tree might be created out of content in the SUBSCRIBE message and stored in a new FilterDAO (data abstraction object).

The filter module 212 may return data based on the request and filter level to a communication device 120, 124, 128 that submitted the request using either protocol. If changes are needed, the filter module 212 may write or provide updates. The filter module 212 may monitor changes to the User Information Service 104 for new data that is created, modified, appended, or deleted. If there is a subscription specified that is requesting notification of changes to the data, then a notification may be sent. Additionally, filters may be applied to the schema, or structure of the User Information Service 104, in a similar fashion.

For SIP subscriptions, the query may persist in the filter module 212 for the duration of a dialog. If a subscription is not renewed before expiration, the dialog may be terminated. The filter may also be persisted in the User Information Service database for use in subsequent queries and subscriptions. For HTTP-based requests, queries may be handled by normal timeout mechanisms. The query may be discarded or tried again after a time limit expires. The filters may be dynamic in the filter module 212, meaning that the filter may return different results at different times as the data and the schema are modified.

The communication server 108 can also include or be connectable to user input devices 224 and user output devices 228. Such devices 224, 228 can be used in connection with the provisioning and operation of the communication server 108 and/or to allow users to access and control data entry, features, and applications resident on the communication server 108. Examples of user input devices 224 may include a keyboard, a numeric keypad, a touch screen, a microphone, a scanner, and a pointing device combined with a screen or other position encoder. Examples of user output devices 228 may include a display, a touch screen display, a monitor, an earpiece, a speaker, and a printer. The communication server 108 may also include a communication interface 232 to interconnect the components of the communication server 108 to the enterprise communication network 116 or any other type of network.

Figure 3:
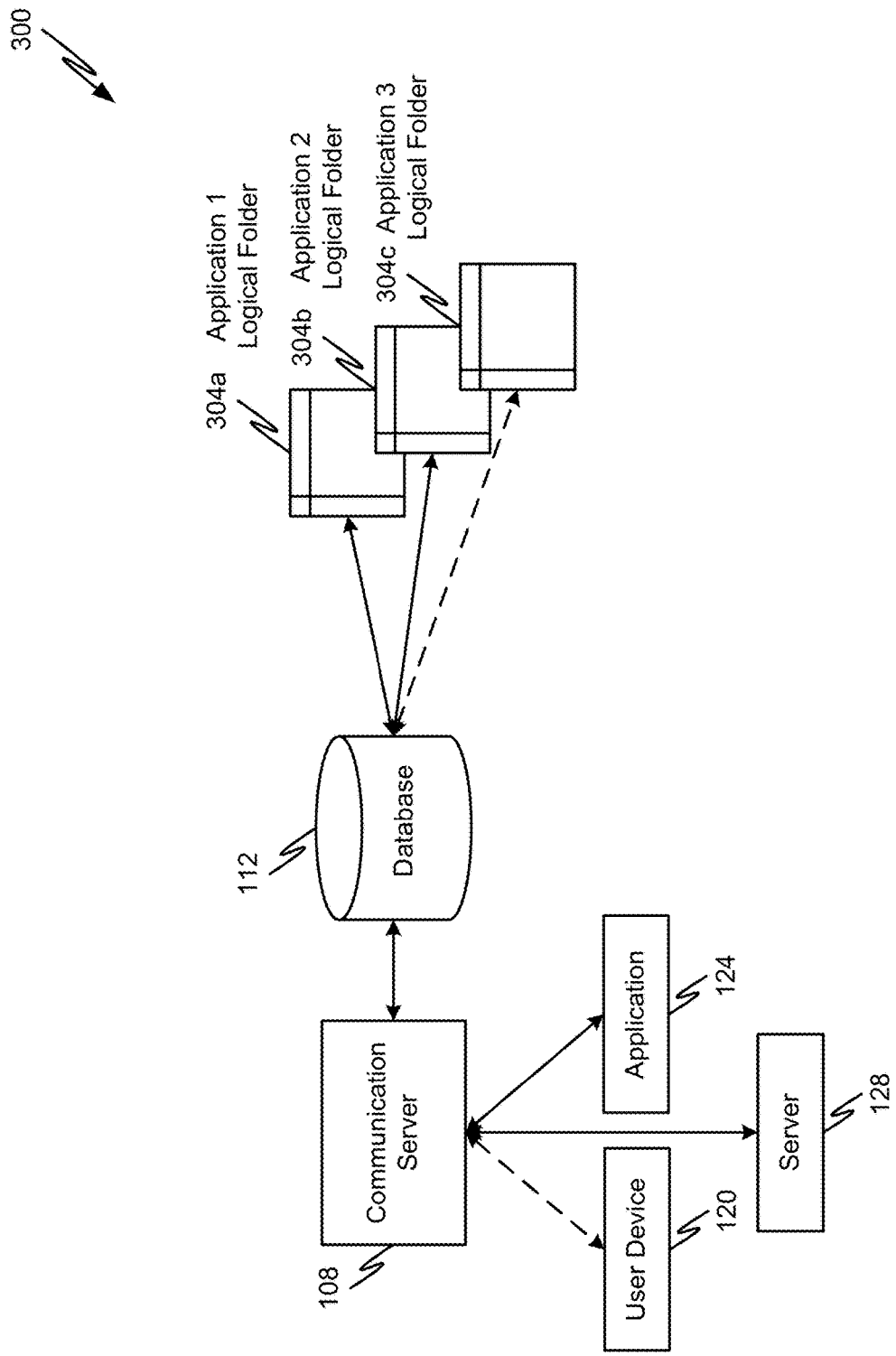
FIG. 3 is a diagram depicting an instantiation of a query or subscription request in accordance with embodiments of the present disclosure.

FIG. 3 is a diagram depicting an instantiation 300 of a request which may be generated by communication devices 120, 124, 128 in accordance with embodiments of the present disclosure.

A communication server 108 may receive requests in the form of queries, subscriptions, and other modification requests. The requests can come from communication devices 120, 124, 128. Communications may be unidirectional or bidirectional based on the capabilities of the communication server 108 and the communication devices 120, 124, 128. Protocols that might be used for the requests, for example, could include SIP, HTTP, LDAP, variants thereof, enhancements thereto, or combinations thereof.

A database 112 may allow applications to form logical folders 304a, 304b, and 304c by creating a new node or collection of nodes. The application may ask the database 112 to store user and application data under or within one or more specified nodes, and access control may be based at the user level. Once written to the database 112, the user data or other information may be available to any communication devices 120, 124, 128 that have authority to access the data and/or have subscribed to receive the data.

FIGS. 4A-4D are block diagrams of a data structure 400 based on filter level in accordance with embodiments of the present disclosure. The filtering and propagation mechanism might be created and delivered to a User Information Service 104 with an extensible schema. The schema sets boundaries and parameters, defining objects in the data structure 400. The data structure 400 may simulate or be in the form of a hierarchical tree structure with a set of linked nodes. The nodes (404 through 428) may contain a value, a condition, and/or represent a separate data structure. Each node (e.g., 412) in a tree has zero or more child nodes (e.g., 416, 420) which are below it in the tree. A node (e.g., 408) that has a child (e.g., 412) is called the child's parent or superior node. The topmost node in a tree is called a root node (e.g., 404), and the root node 404 will not have parents. Nodes at the lowest level of the tree are called leaf nodes (e.g., 420).

In embodiments, the data structure 400 may include specific information for users. The data structure 400 can include one or more fields which represent user data including, for example, a person's name, a person's address, a person's telephone number, a person's email address, a person's contacts, a list of events, a set of logs, and any other collectable or required user information. While there are only four levels of nodes shown 408, 412, 416, 420 in data structure 400 in FIGS. 4A-4D, there may be more or fewer data fields, nodes, and levels associated with data structure 400. The user information in each node may include numeric, alpha, and alphanumeric data as well as images, animations, widgets, recorded names, and other stored content in any combination. Hereinafter, the data structure 400 and all aspects of the tree structure and the nodes shall be explained with reference to the systems, components, modules, software, data structures, etc. described in conjunction with FIGS. 1-3.

Figure 4A:
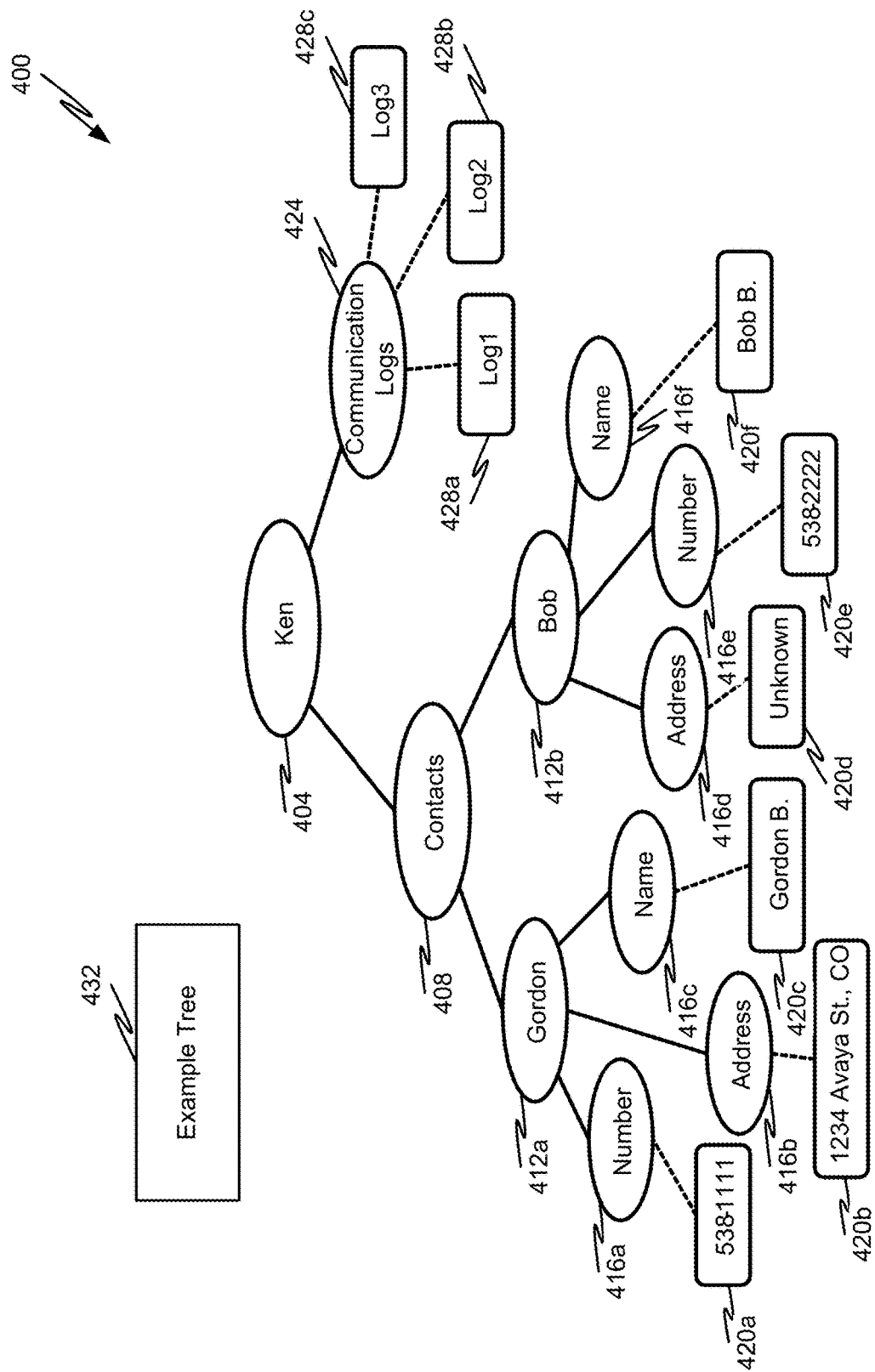
FIG. 4A is a block diagram of a data tree in accordance with embodiments of the present disclosure.

FIG. 4A is a block diagram of a tree data structure 400 in accordance with embodiments of the present disclosure. FIG. 4A is an example tree 432 that has no filter applied. The root node may be the topmost node 404 which contains a user name like "Ken." The user name node Ken 404 may or may not be the root node, and may or may not have parent or child nodes. In this illustration, the root user name node Ken 404 may have child nodes 408, 424. Node 408 may represent Ken's "Contacts," a potential list of Ken's co-workers, clients, family members, supervisors, or any other contact. The Contacts node 408 may be one level beneath the user name node Ken 404. The user name node Ken 404 may additionally have a second child. Node 424 may represent Ken's "Communication Logs," a potential set of incidents, errors, and facts correlated to user node Ken's 404 activities. The Communication Logs node 424 may be one level beneath the user name node Ken 404. In this illustration, the user name node Ken 404 may have two first level children 408, 424 but could have more or less than two first level children 408, 424 based on the schema and input provided. The user name node Ken 404 may have two first level children 408, 424 that may also have children. The Contacts node 408 may or may not have child nodes. In this illustration, the Contacts node 408 may have child nodes 412a, 412b. Node 412a may represent Ken's Contact "Gordon." Node 412b may represent Ken's Contact "Bob." The Gordon node 412a may be one level beneath the Contacts node 408. Similarly, the Bob node 412b may be one level beneath the Contacts node 408. In this tree, the Contacts node 408 may have two second level children 412a, 412b but could have more or less than two second level children 412a, 412b based on the schema and input provided.

The Communication Logs node 424 may or may not have child nodes. In this illustration, The Communication Logs node 424 may have child nodes 428a-c. Node 428a may represent the Communication Logs' "Log 1." Node 428b may represent the Communication Logs' "Log 2." Node 428c may represent the Communication Logs' "Log 3." The Log 1 node 428a may be one level beneath the Communication Logs node 424. The Log 2 428b and the Log 3 428c may similarly be one level beneath the Communication Logs node 424. In this tree, the Logs 1-3 do not show children but could have child nodes based on the schema and input provided.

The Gordon node 412a and the Bob node 412b may or may not have child nodes. In this tree, the Gordon node 412a may have child nodes 416a-c and the Bob node 412b may have child nodes 416d-f. Nodes 416a-c may represent Gordon's category of "Number," "Name," or "Address." Nodes 416d-f may represent Bob's category of "Number," "Name," or "Address." The Number, Name, and Address nodes 416a-f may be one level beneath the Gordon node 412a and the Bob node 412b, and two levels beneath the Contacts node 408. In this illustration, the Number, Name, and Address nodes 416a-c may each have a third level child 420a-f, but could have more or less than one third level child 420a-f based on based on the schema and input provided. The example tree 432 may begin simply and over time expand as an ever-growing data structure. The number of levels and nodes may be more or less than shown, and the structure may vary over time.

Figure 4B:
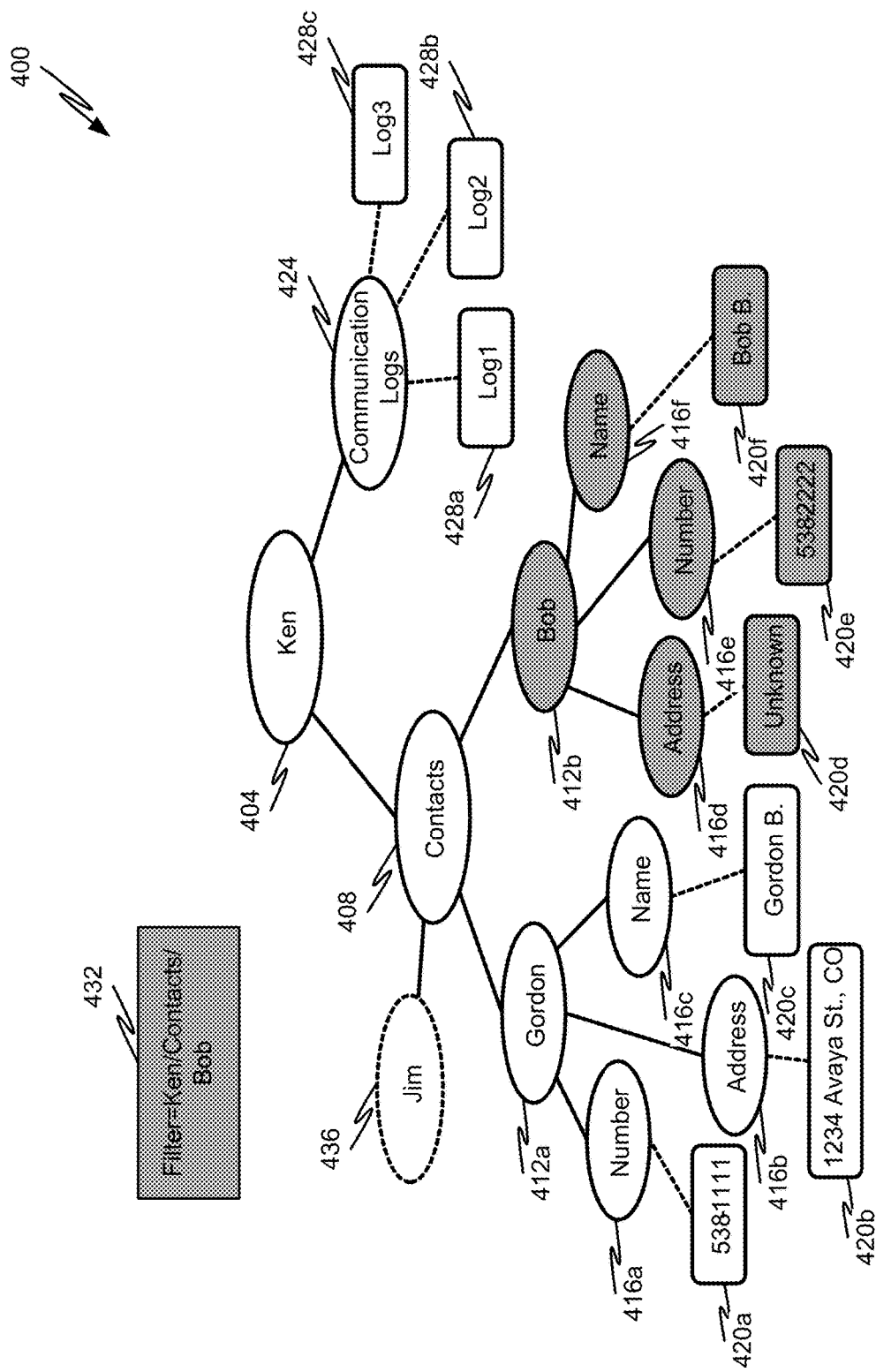
FIG. 4B is a block diagram of a data tree with a third level filter in accordance with embodiments of the present disclosure.

FIG. 4B is a block diagram of a tree data structure 400 with a third level filter 432 in accordance with embodiments of the present disclosure. Hereinafter, FIG. 4B and all aspects of the tree structure and the nodes shall reference back to the example tree described in FIG. 4A.

The third level filter 432 "Filter=Ken/Contacts/Bob" may refer to nodes including the user name node Ken 404, the Contacts node 408, and the Bob node 412b. In this illustration, the data that might be returned with the query or subscription includes the nodes in grey 412b, 416d, 416e,

416f, 420d, 420e, 420f. If there were a change on "Ken/Contacts/Gordon" there would be no notification. If there were a change on "Ken/Contacts/Bob/Address" a notification of the change might be sent in response to the one-time query or any persisting subscriptions. If a new Contact node "Jim" 436 were added, there would be no notification. If information was appended to "Ken/Communication Logs/Log 1" there would be no notification.

Figure 4C:
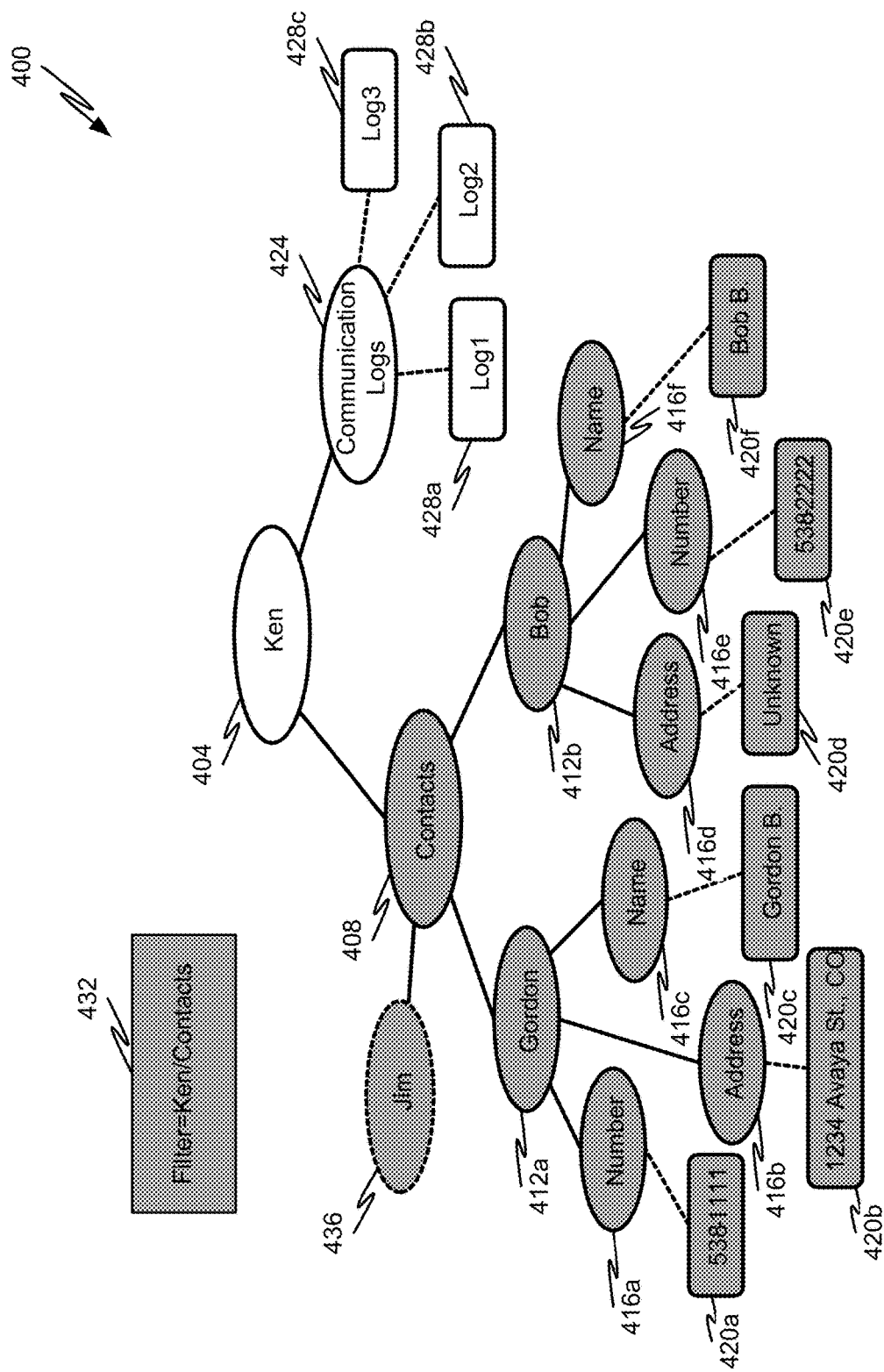
FIG. 4C is a block diagram of a data tree with a second level filter in accordance with embodiments of the present disclosure.

FIG. 4C is a block diagram of a tree data structure 400 with a second level filter 432 in accordance with embodiments of the present disclosure. Hereinafter, FIG. 4C and all aspects of the tree structure and the nodes shall reference back to the example tree described in FIG. 4A.

The second level filter 432 "Filter=Ken/Contacts" may refer to nodes including the user name node Ken 404 and the Contacts node 408. In this illustration, the data that might be returned with the query or subscription includes the nodes in grey 408, 412a, 412b, 416a, 416b, 416c, 416d, 416e, 416f, 420a, 420b, 420c, 420d, 420e, 420f, and 436. If there were a change on "Ken/Contacts/Gordon" a notification of the change might be sent in response to the one-time query or any persisting subscriptions. If there were a change on "Ken/Contacts/Bob/Address" a notification of the change might be sent in response to the one-time query or any persisting subscriptions. If a new contact "Jim" were added under Ken's Contacts, a notification of the change might be sent in response to the one-time query or any persisting subscriptions. If information was appended to "Ken/Communication Logs/Log1" there would be no notification.

Figure 4D:
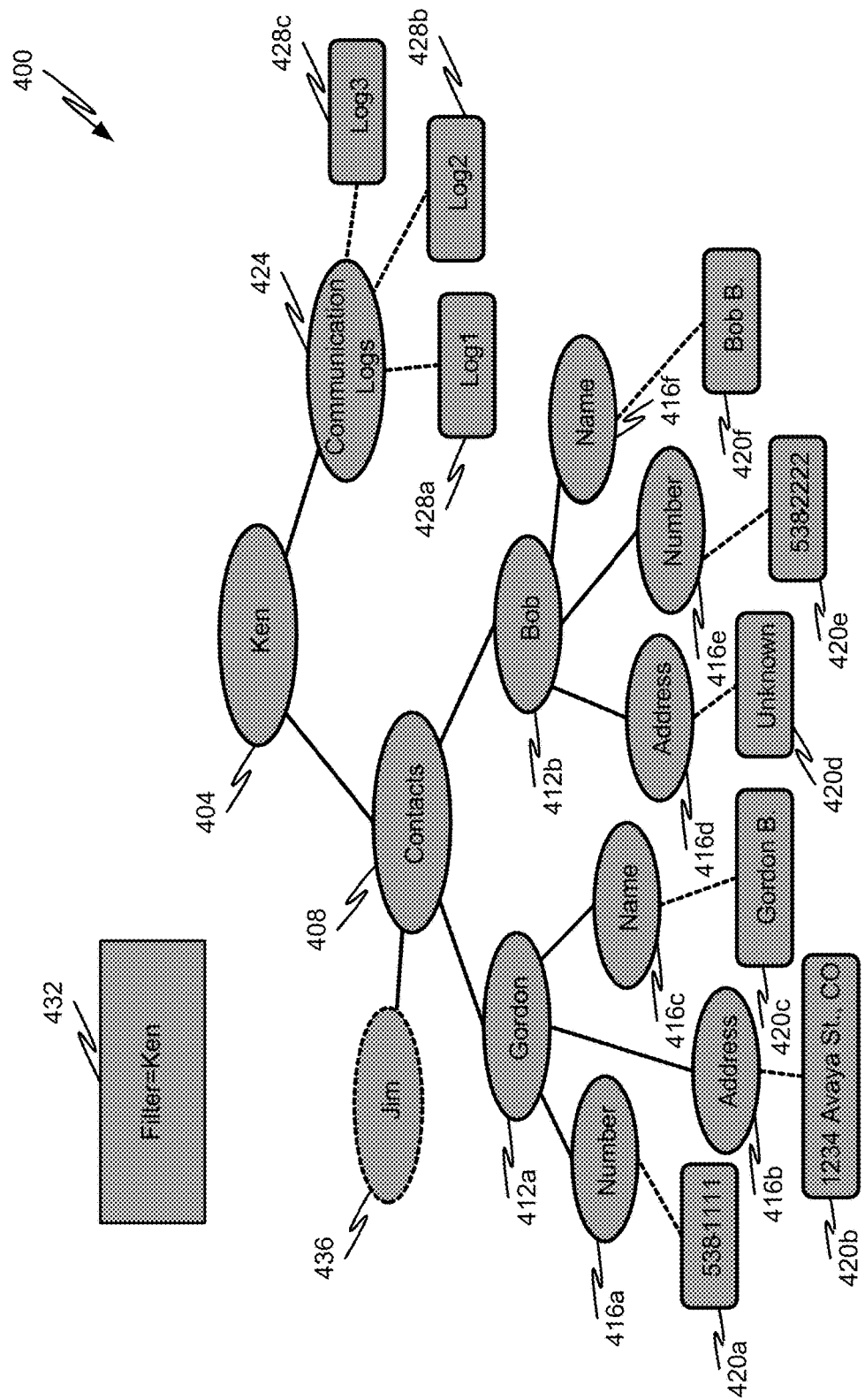
FIG. 4D is a block diagram of a data tree with a first level filter in accordance with embodiments of the present disclosure.

FIG. 4D is a block diagram of a tree data structure with a first level filter 432 in accordance with embodiments of the present disclosure. Hereinafter, FIG. 4D and all aspects of the tree structure and the nodes shall reference back to the example tree described in FIG. 4A.

The one level filter 432 "Filter=Ken" may refer to a node including the user name node Ken 404. In this illustration, the data that might be returned with the query or subscription includes the nodes in grey 404, 408, 412a, 412b, 416a, 416b, 416c, 416d, 416e, 416f, 420a, 420b, 420c, 420d, 420e, 420f, 424, 428a, 428b, 428c, and 436. If there were a change on "Ken/Contacts/Gordon" a notification of the change might be sent in response to the one-time query or any persisting subscriptions. If there were a change on "Ken/Contacts/Bob/Address" a notification of the change might be sent in response to the one-time query or any persisting subscriptions. If a new contact "Jim" were added under Ken's Contacts, a notification of the change via a NOTIFY message might be sent in response to the one-time query or any persisting subscriptions. If information was appended to "Ken/Communication Logs/Log1" a notification of the change might be sent in response to the one-time query, persisting subscriptions, or in response to any type of modification request. For example, if node 436 did not exist in the tree when the subscription was set, no data would have been returned at that time. Once the node 436 is created, it can be subject to the filter criteria and notification may be sent.

The ability of the extensible data filtering tree model to create and write to a database employing first, second, and third level filters 432 can be significant as demonstrated. Four levels of data have been shown for illustrative purposes, but embodiments are not so limited. Filtering criteria may specify the depth, including where filtering starts in the tree and how deep the filtering goes from the place of origin to the number of child relationships. For example, if the filtering criteria contains origin=1 and depth=2, the value of "1" specifies a place of origin from where the data filtering may begin and the value of "2" specifies a second level filter and determines where the data filtering may end. In another example, if the filtering criteria contains origin=3 and depth=0, the value of "3" specifies a place of origin from where the data filtering may begin and the value of "0" specifies no filter depth, meaning no data may be filtered and/or returned.

With reference now to FIG. 5, aspects of a method of creating and writing to a data filtering and propagation system in accordance with embodiments of the present disclosure are depicted. While a general order for the steps of the method 500 are shown in FIG. 5, the method 500 can include more or fewer steps or the order of the steps can be arranged differently than those shown in FIG. 5. The method 500 can be executed as a set of computer-executable instructions executed by a computer system and encoded or stored on a non-transitory computer readable medium.

In typical circumstances, an administrator for a User Information Service 104 may come into an office and log into a communication server 108. In step 504, the administrator may set parameters to make the User Information Service 104 available or may access an existing User Information Service 104. The administrator is likely to check and see if users have been provisioned and exist in the server, in step 508. If a user does not yet exist in the User Information Service 104, the administrator may proceed with user provisioning, in step 512. When a new user is provisioned, a script may be run to populate a set of defaults around the root of the tree, in step 516. The user information may be written into the user data module 216 for use by the server 108 and communication devices 120, 124, 128.

The administrator may also install one or more device applications on communication devices 120, 124, 128 in step 520. When an application first accesses the User Information Service 104, the application may perform its own initialization of data associated with its users, in step 524. Each application with user information to share via the User Information Service 104 may extend the schema for its user and write its sharable data as part of the initialization. The device applications on the communication devices 120, 124, 128 may be of any type or variety, including but not limited to business and enterprise software applications, accounting software applications, graphics software applications, educational software applications, communication applications (e.g., sequenced applications), and the like. During runtime of the application, additional data may be written into the database 112.

A device or application 120, 124, 128 of the provisioned user may change, add, or remove data as needed via the web services module 220, in step 528. Modifications to and addition of data by provisioned users and applications may generate and send notification messages, in step 528. Additionally, changes in the schema including additions, deletions, and modifications may also generate and send notification messages. As new users are provisioned or removed, new applications are installed or removed, or users make changes through communication devices 120, 124, 128, the changes may be written and propagated and notifications may be sent as previously described through the extensible filtering and propagation model. As additional User Information Service 104 requests are received, step 528 may be invoked repeatedly.

Figure 6:
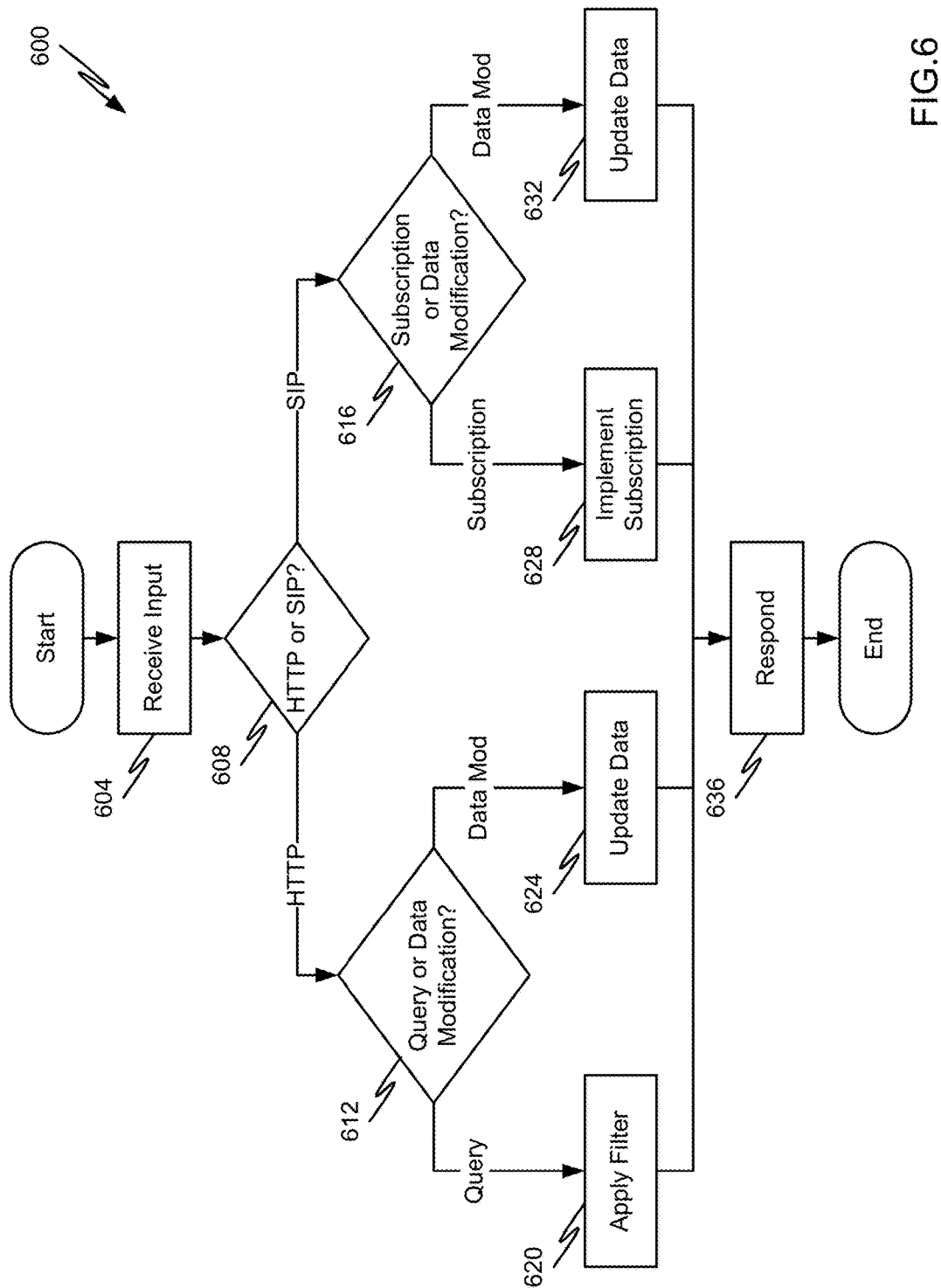
FIG. 6 is a flow chart depicting a method of information publication, storage and retrieval from a data filtering system in accordance with embodiments of the present disclosure.

With reference now to FIG. 6, aspects of a method of filter application and information publication and retrieval from a data structure are depicted in accordance with embodiments of the present disclosure. Generally, the method 600 begins with a start operation and ends with an end operation. While a general order for the steps of the method 600 are shown in FIG. 6, the method 600 can include more or fewer steps or the order of the steps can be arranged differently than those shown in FIG. 6. The method 600 can be executed as a set of computer-executable instructions executed by a computer system and encoded or stored on a non-transitory computer readable medium.

Generally, the method begins with a request sent from a communication device 120, 124, 128. The input may be received by the User Information Service 104, in step 604. At step 608, a determination may be made as to whether the request from step 604 is a one-time query or a request to establish a subscription. If the input is a request as a one-time query, the expires value is 0, and it may request a snapshot. If the input is a request as a subscription, the expires value is non-zero, and it may request a snapshot and future changes. A zero expires value means to notify only once. A non-zero expires value means to notify whenever data that passes the associated filter specifies changes.

The process continues with steps 612 and 616 with a determination as to protocol format. The input that is received in step 612 may be in hypertext transfer protocol (HTTP), and the input that is received in step 616 may be in session initiation protocol (SIP) format. A RESTful HTTP GET is a common mechanism if the query is in the HTTP protocol format. A subscription is a common SIP mechanism for the query. For HTTP, step 612 may pose the question as to whether the input is a query or a request for data modification or schema modification. For SIP, step 616 may pose the question as to whether the input is for a subscription or a request for data modification or schema modification. For the protocol decision step 608, HTTP and SIP may be considered representative examples. Other read and write protocols could alternatively be used for this step.

Once the request type has been determined and the protocol identified, the communication server 108 filter module 212 may apply a filter based on the HTTP input, in step 620. The extensible data filtering model may return data based on the request and filter level as described previously to the communication device 120, 124, 128 who submitted the request received by the User Information Service 104 in step 604. If data modification or schema modification is included in the HTTP request, the filter module 212 may update the data or the schema with a write or provide updates, per the request, in step 624. In the case of SIP input, the communication server 108 filter module 212 may implement a subscription based on the request, in step 628. If data modification or schema modification is included in the SIP request, the filter module 212 may update the data or the schema with a write or provide updates, per the request, in step 632. In step 636, a response to the request may be returned to the communication device 120, 124, 128 that made the initial request. Notifications may be returned to the communication device 120, 124, 128 that made the initial request and notifications may additionally be sent to communication devices 120, 124, 128 with active subscriptions. Once the request has been satisfied and responses are completed, the process ends.

As can be appreciated by one of skill in the art after consideration of the present disclosure, the provision of an extensible data filtering model where data is organized into a tree with automatic data propagation and efficient multi-level filtering can assist an administrator in effectively managing user data. Therefore, by providing support for multi-level filtering and propagation, systems and methods as disclosed herein can lead to more efficient data and time management, efficient application evolution, and to more satisfied users.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a user interface, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Additionally, protocols that might be used for requests including SIP, HTTP, LDAP, or other protocols may be used in conjunction with the embodiments. The protocols used in this application are intended as representative examples only. Other protocols may be used in conjunction with or in place of any of the protocol examples.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
receiving, by a server, a query from a communication device, the query defining a filter criterion to be applied to a data structure that comprises a first node that is a parent node and a second node that is a child node of the parent node;
applying, by the server, the filter criterion to the data structure as a result of the query by searching both the first and second nodes for an entry that satisfies the filter criterion to obtain a first result;
automatically applying, by the server, the query to a third node to obtain a second result, the third node being created in the data structure after the first result is obtained;
and
generating, by the server, a notification comprising the second result that is provided to the communication device.

2. The method of claim 1, wherein the server determines a protocol of the query, and wherein the server determines that the query corresponds to a RESTful GET request.

3. The method of claim 1, wherein the query is a SUBSCRIBE request, wherein the server determines a protocol of the query, wherein the server determines that the query corresponds to a Session Initiation Protocol (SIP) subscription request, wherein the notification comprising the second result is a NOTIFY message provided to the communication device, and wherein an eventing tree is created from the SUBSCRIBE request.

4. The method of claim 1, wherein the data structure is accessible via both Hypertext Transfer Protocol (HTTP) requests and Session Initiation Protocol (SIP) requests, and wherein the data structure is a tree-type data structure.

5. The method of claim 1, further comprising:
creating, by the server, logical folders corresponding to nodes in the data structure, wherein a new node is created after the notification comprising the second result is provided;
automatically applying, by the server, the query to the new node to obtain a third result; and
automatically saving, by the server, the third result in the logical folders, wherein the communication device has access to the third result in the logical folders.

6. The method of claim 1, wherein the server receives a plurality of queries from a plurality of communication devices, wherein the query is one of the plurality of queries, wherein the communication device is one of the plurality of communication devices and corresponds to a user device, wherein a second communication device of the plurality of communication devices corresponds to an application, and wherein a third communication device of the plurality of communication devices corresponds to a server.

7. The method of claim 6, wherein a fourth communication device of the plurality of communication devices corresponds to a sequenced Session Initiation Protocol (SIP) application.

8. The method of claim 1, wherein the at least one filter criterion specifies a filter depth which defines how deep within the data structure filtering starts by identifying a place of origin within the data structure and identifying a number of child relationships to filter relative to the place of origin, and wherein the third node is within the number of child relationships to filter.

9. A communication system, comprising:
a microprocessor; and
a filter module that, when executed by the microprocessor, receives a query for data associated with a user, wherein the query is received from a communication device, and in response the filter module:
defines a filter criterion that is applied to a data structure that comprises a first node that is a parent node and a second node that is a child node of the parent node;
automatically applies the filter criterion to the data structure as a result of the query by searching both the first and second nodes for an entry that satisfies the filter criterion to obtain a first result;
automatically applies the query to a third node to obtain a second result, the third node being created in the data structure after the first result is obtained;
generates a notification comprising the second result; and
provides the notification to the communication device.

10. The system of claim 9, wherein the query corresponds to a RESTful GET request and the query is automatically provided, by the microprocessor, to a second device that has a subscription associated with the notification that is generated after the first result is obtained.

11. The system of claim 9, wherein the data structure is a tree-type data structure that is accessible by the microprocessor via both Hypertext Transfer Protocol (HTTP) requests and Session Initiation Protocol (SIP) requests, and wherein the query corresponds to a Session Initiation Protocol (SIP) subscription request.

12. The system of claim 9, wherein the third node has a Session Initiation Protocol (SIP) subscription from a second device, and the notification is automatically provided by the microprocessor to the second device based on the SIP subscription and the automatically applying the query to obtain the second result.

13. The system of claim 9, wherein the communication device corresponds to one of a user device, an application and a server, and wherein the communication device corresponds to a sequenced Session Initiation Protocol (SIP) application.

14. A non-transient computer-readable medium comprising processor-executable instructions, the instructions comprising:
instructions that receive a query from a communication device, the query defining a filter criterion that is applied to a data structure that comprises a first node that is a parent node and a second node that is a child node of the parent node;
instructions that apply the filter criterion to the data structure as a result of the query by searching both the first and second nodes for an entry that satisfies the filter criterion to obtain a first result;
instructions that automatically apply the query to a third node to obtain a second result, the third node being created in the data structure after the first result is obtained;
and
instructions that generate a notification comprising the second result that is provided to the communication device.

15. The computer-readable medium of claim 14, wherein the query corresponds to one of a RESTful GET request and a Session Initiation Protocol (SIP) subscription request.

16. The computer-readable medium of claim 14, wherein the instructions further comprise instructions that automatically apply the query to any newly added nodes, the newly added nodes being created in the data structure after the second result is obtained, and instructions that automatically generate additional notifications based on the query being applied to the newly added nodes.

17. The computer-readable medium of claim 15, wherein the data structure is accessible via both Hypertext Transfer Protocol (HTTP) requests and Session Initiation Protocol (SIP) requests.

18. The computer-readable medium of claim 17, wherein the data structure is a tree-type data structure and wherein the notification is automatically generated and provided to the second device and the notification includes a definition of the filter results.

19. The computer-readable medium of claim 14, wherein the communication device corresponds to at least one of a user device, application and server, and wherein the communication device corresponds to a sequenced Session Initiation Protocol (SIP) application.

20. The method of claim 1, wherein the searching both the first and second nodes occurs at a same point in time as the result of the single query.

* * * * *